Figure 1:
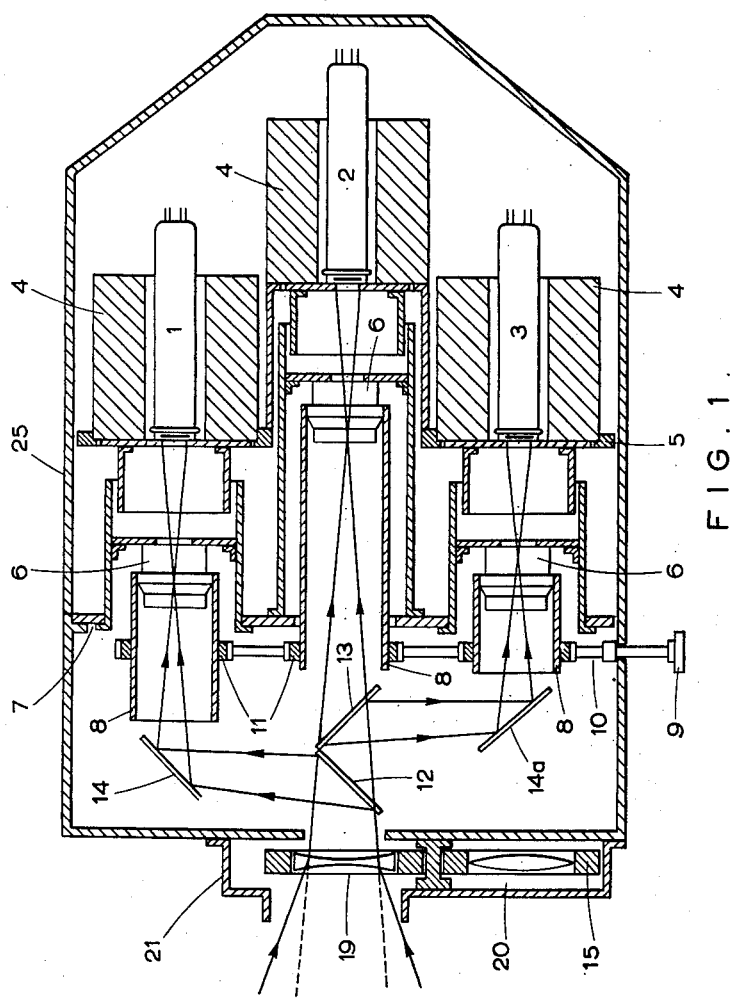

United States Patent Office 3,017,454
Patented Jan. 16, 1962

3,017,454
COLOUR TELEVISION CAMERAS
Ivanhoe John Penfound James, South Ealing, London, and George Charles Newton, Hayes, England, assignors to Electric & Musical Industries Limited, Hayes, England, a company of Great Britain
Filed Mar. 18, 1958, Ser. No. 722,172
Claims priority, application Great Britain Mar. 22, 1957
7 Claims. (Cl. 178—5.4)

This invention relates to colour television cameras.

It is proposed to provide a colour television camera comprising three pick-up tubes, with which are associated dichroic mirrors arranged to divide incident light into different colour components for projecton onto the individual pick-up tubes in the camera. The camera may have a common objective mounted before the dichroic mirrors, but in this case in order to provide sufficient space for the dichroic mirrors between the objective lens and the pick-up tubes, having regard to the short focal length of the objective, it is often necessary to introduce a relay lens into the system but the relay lens may reduce the quality and definition of the image and introduce an appreciable loss of light. This loss of light can be an important factor affecting the efficiency of operation of the pick-up tubes. As an alternative it has been proposed to provide the pick-up tubes with individual objective lenses, and to place the dichroic mirrors on the object sides of the objective lenses. This arrangement permits a simple geometrical relationship between the positions of the pick-up tubes and facilitates focusing of the camera.

The alternative proposal has however the substantial disadvantage that, since three objective lenses are used, when the viewing angle is required to be changed it is necessary to change three lenses. The provision of three of each of a range of lenses is costly since the objective lenses must be corrected for the respective colours which are transmitted by them. It is inconvenient furthermore to make lens changes whilst the camera is in use because the lenses, being between the dichroic mirrors and the pick-up tubes would normally be contained within the body of the camera and may be relatively inaccessible.

There is moreover a further disadvantage in the above arrangement, which arises out of the physical properties of dichroic mirrors. Dichroic mirrors of the form usually employed have the property that their reflection and transmission characteristics are a function of the angle of incidence of the light projected on them. This means that the reflection and transmission properties differ for extreme rays on opposite sides of the axis of an optical system, and when a wide angle objective is used this difference may be significant. It will be understood moreover that when a television camera is in operation wide angle fields of view are frequently employed.

The object of the present invention is substantially to reduce one or both of the above mentioned disadvantages by providing an improved colour television camera.

According to the present invention there is provided a colour television camera having at least two pick-up tubes and a dichroic mirror for dividing incident light into different colour components, at least two objective lenses one for each pick-up tube disposed respectively between said dichroic mirror and respective pick-up tubes for focusing colour components of an image transmitted or reflected by said mirror onto said respective pick-up tubes, and a further lens disposed before said dichroic mirror and arranged in combination with each of the objective lenses to produce an equivalent lens of different angle of field of view from that of the respective objective lenses alone.

In a preferred embodiment of the invention said further lens is one of a plurality of lenses of different focal lengths mounted on a turret which is movable to locate a selected one of said plurality of lenses in the optical path from a field of view, whereby the effective focal length of the optical system in the camera may be varied thereby removing the above first mentioned disadvantage.

According to a further aspect of the invention said further lens is a negative lens whereby a relatively large field of view may be accommodated by said camera whilst the above mentioned limitations imposed by the dichroic mirrors are substantially reduced.

Figure 2:
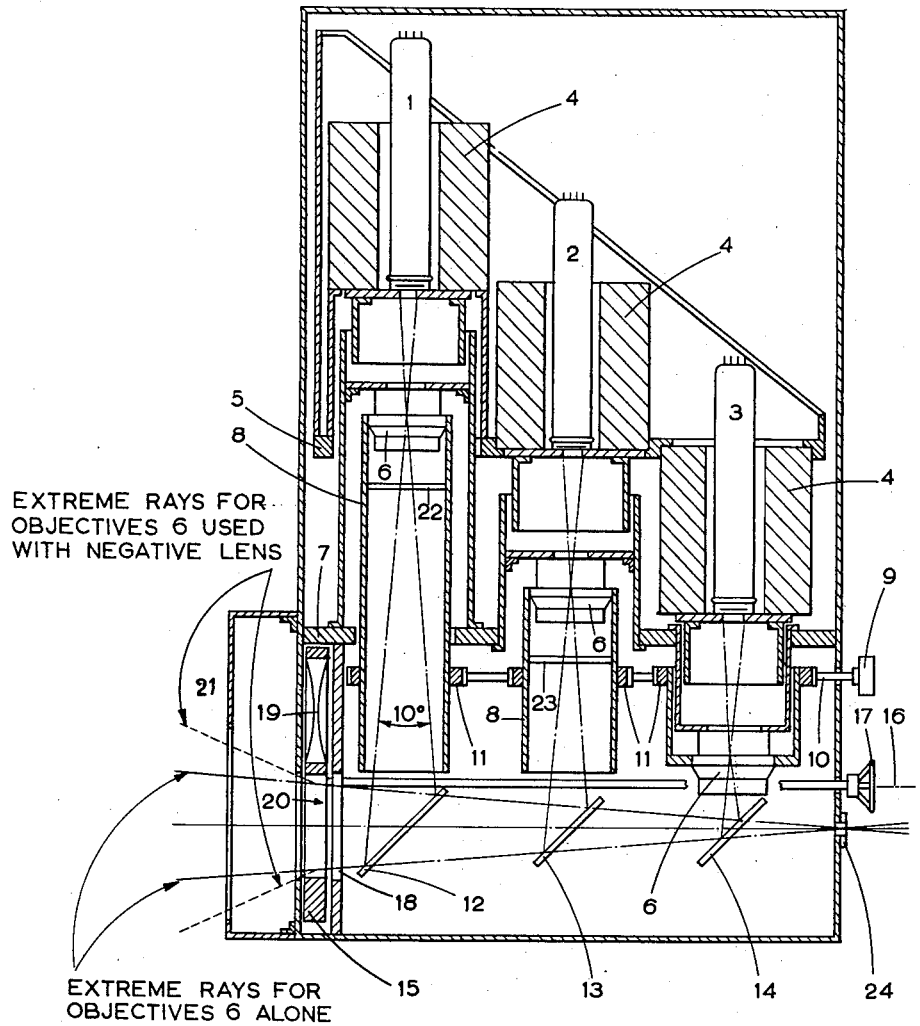

In order that the invention may be more clearly understood and readily carried into effect, the invention will be described with reference to the accompanying drawings, in which:

FIGURE 1 illustrates one example of a colour television camera according to the invention, and FIGURE 2 illustrates a further example of a colour television camera according to the invention.

Referring to FIGURE 1, the camera comprises three pick-up tubes 1, 2 and 3 which are mounted with their axes parallel. The pick-up tubes may have photo-conductive targets and are provided with scanning and focusing coil assemblies, which are of well known construction and are indicated in the drawing by reference 4. The focusing and scanning coil assemblies will therefore not be further described and for simplicity the connecting leads to the pick-up tubes are omitted. The pick-up tubes are supported from a mounting plate 5 in such a way that the tubes and their scanning and focusing coil assemblies can be displaced as a unit in a direction parallel to the tube axes for focusing purposes. The focusing mechanism is, for clarity in the drawing, not shown but in practice it may comprise a rack and pinion mechanism of known form operated by means of a control handle on the outside of the camera case. Three objective lenses, one for each pick-up tube are indicated by reference 6 and these lenses are supported from a lens mounting plate 7 which is fixed to the inside of the camera case. The pick-up tubes are therefore movable in relation to the objective lenses which are fixed in the case. Each objective lens is provided with a lens hood tube 8 which serves to prevent scattered light associated with one lens entering another. Moreover each tube 8 co-operates with an aperture control, being attached at the innermost end to the iris control ring of the lens. The control may be effected by a handle 9 disposed to the outside of the case mounted on a spindle 10 which carries worm gears meshing with gear teeth on the outsides of the tubes 8. Dichroic mirrors 12 and 13 are mounted in planes which are mutually at right angles but are at 45° to the axes of the pick-up tube 2, in the path of light entering the camera from the field which it will be understood, is to the left of the figure. Parallel to the dichroic mirror 12 there is mounted a fully reflecting plane mirror 14 to receive light reflected from 12 and reflect it to the pick-up tube 1 via its respective objective lens. Similarly a further fully reflecting plane mirror 14a is mounted parallel to the dichroic mirror 13 to reflect light reflected from 13 into the pick-up tube 3 via its respective objective lens. Light transmitted by 12 and 13 passes to the pick-up tube 2 via the third objective lens. Moreover the arrangement in the camera is such that the optical paths from the dichroic mirror 12 either by transmission or reflection to the pick-up tubes 1, 2 and 3 are substantially equal. The dichroic mirror 12 is chosen to reflect the blue component of received light and transmit the red and green components whereas the dichroic mirror 13 is chosen to reflect the red component of received light and transmit the green component. Thus the pick-up tube 1 receives the blue component of light received from the field of view, the pick-up tube 2 receives green light from the field of view, and the pick-up tube 3 receives red light from the field of view.

A lens turret 15 is mounted in front of an aperture 18 in the camera case 25 and the turret carries a negative lens 19 and a positive lens 20, the negative lens being shown in front of the aperture 18 in the drawing. The turret may be rotated by means of suitable gearing, which is not shown, by turning a handle mounted on the side of the camera case, to locate one or other of the lenses 19 and 20 in front of the aperture 18. Moreover although it is not shown in the drawing the turret may carry further lenses or in addition one aperture in the turret may be provided with no lens so that light is transmitted direct from the field of view via the dichroic mirrors into the respective objective lenses in the camera. The turret 15 is shielded furthermore by means of a lens hood 21.

In a practical form of the camera shown in FIGURE 1 the objective lenses 6 have focal lengths of approximately three inches which having regard therefore to the size of the targets in the pick-up tubes 1, 2 and 3 restricts the angle of view of the camera to an angle of about 10°. In consequence the greatest difference between the angles of incidence of extreme rays on the dichroic mirrors 12 and 13 is only about 10° and this angle is sufficiently small to make certain that there is no significant difference in the transmission and reflection properties of the dichroic mirrors for the extreme rays. In many cases however, a field of view which is considerably greater than 10° is required, say 30°, and in this case, the negative lens 19 is positioned in front of the aperture 18 to substantially increase the field of view without increasing the angle of incidence of extreme rays on the dichroic mirrors. By way of an example a negative lens in the turret may have a focal length of magnitude between 4½ and 18 inches according to the field of view required. In certain cases moreover if a small close-up object is to be in focus it may be desirable to provide a smaller field of view and this can be achieved by positioning a positive lens such as 20 in front of the aperture 18.

Referring to FIGURE 2 this figure illustrates a further camera arrangement according to the invention and for convenience the corresponding components which are substantially the same as the components of FIGURE 1, have been alloted the same references. The camera arrangement in FIGURE 2 is essentially only different from FIGURE 1 in one feature, namely that the light reaching the pick-up tubes 1, 2 and 3 reaches them by reflection whereas in FIGURE 1 light from the field of view is transmitted via the dichroic mirrors 12 and 13 to the pick-up tube 2 and only tubes 1 and 3 receive reflected light. In order that this arrangement may be operable with objective lenses 6 having substantially identical focal lengths it is again arranged that the optical paths from the aperture 18 in the camera case or alternatively the dichroic mirror 12 to the pick-up tubes 1, 2 and 3, are substantially equal. This is achieved by making the respective distances of 1, 2 and 3 from the mirrors 12, 13 and 14 successively less by an amount equal to the respective separations between the mirrors 12 and 13 and 13 and 14.

The mirrors 12 and 13 as before are dichroic mirrors, which respectively reflect blue light and transmit other components, and reflect red light and transmit green light. It is of course understood as it is for FIGURE 1, that there is to be no substantial difference between the angles of incidence of extreme rays on these dichroic mirrors. The pick-up tubes 1, 2 and 3 are therefore made to be responsive to blue, red and green light respectively received from the field of view. The plane mirror 14 is arranged to allow transmission of a small proportion of the light incident upon it to enable an eye piece 24 to be used as a view finder for the camera. This eye piece may however be dispensed with if an alternative form of view finder is provided on the camera. In a similar manner to that mentioned for the camera in FIGURE 1 the lens tubes 8 co-operate with iris mechanisms which are controllable together by means of the handle 9. A turret 15 is mounted in front of the aperture 18 and is movable by means of a handle 17 to bring a selected one of a number of apertures in the turret into registration with the aperture 18. In the drawing two apertures in the turret are shown and are occupied by a negative lens 19 and a flat plate of glass 20. Extreme rays for the dichroic mirrors 12 and 13 and the objective lenses 6 are indicated in the drawing for individual cases when the lens 19 and the glass plate 20 are positioned in front of 18. Thus it is seen that a much wider angle of view is obtainable by registering the negative lens 19 in the operative position. Although moreover only a plate of glass and a negative lens are shown in the turret 15, a number of other lenses may be provided which may be positive or negative lenses according to the desired range of angles of view required for the camera. But it is pointed out that according to the range of lenses it is required to use in the turret the distances of travel for the focusing device which operates the plate 5 upon which the pick-up tubes are mounted may require to be extended considerably to provide correct focusing for the objectives 6. Again, a lens hood 21 is provided in front of the turret 20 to reduce the amount of stray light entering the optical system.

Dichroic mirrors in certain circumstances have the disadvantage that in addition to reflecting light from the front surfaces in the required manner to provide the requisite filtering, they tend also to reflect light from their back surfaces. The reflected light having a colour falling within the transmission spectrum of the filter material can pass through the front surface to form a secondary image of the wrong colour at the pick-up tube. To reduce this effect it may be desirable to include colour filters 22 and 23 as shown in FIGURE 2 in front of the objectives associated with the pick-up tubes 1 and 2. The filter 22 is arranged to transmit blue light only whilst the filter 23 is arranged to transmit red light only so that the filters can prevent the formation of the above mentioned secondary images. Although such filters are not shown in FIGURE 1 they may clearly be included if desired.

When a lens is used in front of dichroic mirrors such as 12 or 13 in the drawing the colour separation images formed at the target surfaces of the pick-up tubes 1, 2 and 3 may be found of slightly different sizes as the result of the different deviations produced by the lens for light of different colours. In consequence therefore the signals generated by the pick-up tubes 1, 2 and 3 corresponding to the marginal areas of a coloured image may display registration errors. This effect may be reduced by using a more highly corrected lens 19 or by arranging that movement of the turret 15 causes a variation of the amplitudes of the scanning waveforms used for the respective pick-up tubes to adjust the sizes of the scanned areas to correspond to the different sizes of the coloured light images. This may be achieved as shown in FIG. 2 by means of an amplitude switch 25 coupled to the shaft operated by 17 in FIGURE 2 and obviously it may similarly be performed by such a switch in FIGURE 1 although the shaft is not shown. Similar corrections may be made in the cases of other lens mounted in the turret 15 and furthermore by employing such circuit means it is possible to obtain satisfactory results with simpler lenses in the turret 15.

Although the invention has been described with reference to two embodiments each employing the three colours red, green and blue the invention is clearly not limited to such a combination of colours for by suitable selection of the dichroic mirors 12 and 13 and subject to considerations outside the scope of the present invention, virtually any combination may be used if desired. Moreover although the invention is described herein with particular reference to two geometrical arrangements of pick-up tubes, the invention is clearly not limited to these arrangements for clearly other arrangements may readily be devised by persons skilled in the art.

By virtue of the invention the disadvantages of a camera employing a number of pick-up tubes and the same number of objectives without the use of relay lenses are substantially reduced. Moreover the disadvantage that the characteristics of dichroic mirrors depend upon the angle of incidence is reduced.

What we claim is:

1. A colour television camera having at least two pick-up tubes and a dichroic mirror for dividing incident light into different colour components, at least two objective lenses one for each pick-up tube disposed respectively between said dichroic mirror and respective pick-up tubes for focusing colour components of an image transmitted or reflected by respective mirror onto said pick-up tubes, and a further lens disposed before said dichroic mirror and arranged in combination with each of the objective lenses to produce an equivalent lens of different angle of field of view from that of the respective objective lenses alone, means for varying the distance between said objective lenses and said pick-up tubes to cause the equivalent lens comprising said objective lens and said further lens to focus objects at different distances from the camera into the respective pick-up tubes.

2. A colour television camera according to claim 1 wherein said further lens is a negative lens to provide a wider angle of field of view than could otherwise be obtained.

3. A colour television camera according to claim 2 wherein said further lens is accommodated in a turret mounted before said dichroic mirror, said turret being equipped with a plurality of lenses to provide a selection of effective angles of field of view for said camera.

4. A colour television camera according to claim 3, wherein said turret is equipped with at least one positive lens to provide a narrower angle of field of view than could otherwise be obtained for said camera.

5. A colour television camera according to claim 1, wherein the angle between extreme rays accepted by said objective lenses is of the order of 10°.

6. A colour television camera according to claim 1 wherein said means for varying the distance between said objective lenses and said pick-up tubes comprises means for varying the position of the tubes in unison relative to said equivalent lens.

7. A colour television camera having at least two pick-up tubes and a dichroic mirror for dividing incident light into different colour components, at least two objective lenses one for each pick-up tube disposed respectively between said dichroic mirror and respective pick-up tubes, means for providing relative focussing movement between said objective lenses and said pick-up tubes for focussing the colour components of an image transmitted or reflected by said dichroic mirror into respective pick-up tubes, and a further lens disposed before said dichroic mirror and arranged in combination with each of the objective lenses to produce an equivalent lens of different angle of field of view from that of the respective objective lenses alone.

References Cited in the file of this patent

UNITED STATES PATENTS

| | | |
|---|---|---|
| 2,724,737 | Hogan | Nov. 22, 1955 |
| 2,757,232 | Goodale | July 31, 1956 |
| 2,808,456 | Wittel | Oct. 1, 1957 |
| 2,848,533 | Burr | Aug. 19, 1958 |